United States Patent

Wayne

[11] Patent Number: 5,259,712
[45] Date of Patent: Nov. 9, 1993

[54] VEHICLE CARGO AREA DIVIDER SYSTEM

[76] Inventor: Mark Wayne, 29436 Briarbank Ct., Southfield, Mich. 48034

[21] Appl. No.: 755,509

[22] Filed: Aug. 30, 1991

Related U.S. Application Data

[63] Continuation-in-part of Ser. No. 617,496, Nov. 23, 1990, Pat. No. 5,044,682.

[51] Int. Cl.⁵ ............................................. B60P 1/64
[52] U.S. Cl. ................................ 410/152; 410/129; 410/143
[58] Field of Search ............. 410/121, 122, 127, 129, 410/130, 131, 140, 141, 142, 143, 144, 145, 146, 147, 151, 152; 296/39.1, 39.2

[56] References Cited

U.S. PATENT DOCUMENTS

| | | | |
|---|---|---|---|
| 2,134,212 | 10/1938 | Sigurdson | 410/142 X |
| 2,697,631 | 12/1954 | Miller | 410/140 |
| 4,215,898 | 8/1980 | Ulics | 296/183 |
| 4,343,578 | 8/1982 | Barnes | 410/151 |
| 4,650,383 | 3/1987 | Hoff | 410/152 X |
| 4,659,136 | 4/1987 | Martin et al. | 410/129 X |
| 4,720,222 | 1/1988 | Nagy et al. | 410/151 |
| 4,772,165 | 9/1988 | Bartkus | 410/145 X |
| 4,932,817 | 6/1990 | Mattare | 410/144 X |
| 4,938,403 | 7/1990 | Cortelli | 410/129 X |
| 4,943,194 | 7/1990 | Aguilar | 410/141 X |
| 4,958,876 | 9/1990 | Diaco et al. | 410/144 X |
| 5,044,682 | 9/1991 | Wayne | 296/39.2 |
| 5,044,848 | 9/1991 | Burnham | 296/39.2 X |
| 5,118,156 | 6/1992 | Richard | 410/152 X |

Primary Examiner—Joseph D. Pape
Attorney, Agent, or Firm—Gifford, Groh, Sprinkle, Patmore and Anderson

[57] ABSTRACT

A divider system for the cargo area of a vehicle is provided comprising one or more dividers and inserts for bracing the dividers. The inserts are of two embodiments. In the first embodiment, a tapered, V-shaped insert is provided for attachment to the slots conventionally provided in a vehicle bed liner. In the second embodiment, an insert is provided that is attachable to the inner wall of a vehicle's cargo area which does not necessarily attach to a liner. The second embodiment is held in place by either an adhesive or a clamping assembly.

14 Claims, 4 Drawing Sheets

VEHICLE CARGO AREA DIVIDER SYSTEM

This is a continuation-in-part of patent application Ser. No. 07/617,496, filed Nov. 23, 1990, now U.S. Pat. No. 5,044,682.

BACKGROUND OF THE INVENTION

I. Field of the Invention

The present invention relates generally to vehicle cargo area divider systems for interfitting with the bed of a pickup truck and the like. More particularly, the present invention relates to a vehicle cargo area divider system for interfitting with the walls of a pickup truck where the system includes one or more removable divider portions and removable inserts interattachable with the liner or with the walls of a cargo area of a vehicle.

II. Description of the Relevant Art

The increasing popularity of the pickup truck can easily be noted by anyone who travels on highways. Automobile companies have noted dramatic growth in the market for pickup trucks and similar vehicles. This is probably due to the fact that these types of vehicles offer extremely practical transportation while concurrently being useable for work and the like. Many auto vehicle owners now have pickup trucks are "second cars" to fill the need for being able to move materials and goods practically and comfortably when necessary.

Very shortly after the explosive growth of the sale of pickup trucks was noted, owners sought ways of protecting their investment. Such ways include seat covers, paint coatings, protective molding and the like. However, probably the most important protective device available for the pickup truck owner is the now very popular bed liner. The pickup truck bed liner is composed of a polymerized material, such as a very hard plastic, and may be easily slipped into the bed of a pickup truck for protection of the bed from scratches and form the elements.

With the pickup truck and bed liner combination, many owners sought to maximize the utility of their pickup truck. Particularly, owners sought to keep, for example, tools in the bed of the pickup truck. To keep tools in the bed of the pickup truck without their rolling and shifting about required the purchase and installation of a pickup truck bed box. However, the bed box has relatively limited utility in that its primary function is directed at the keeping and storage of tools and the like. It is not, for example, directed at use such as may be found for keeping larger and more cumbersome items.

Accordingly, other methods of maximizing the utilization of the pickup truck bed were sought. One such answer was to include in the pickup truck bed a series of dividers whereby the pickup truck owner could divide the bed into two or more sections, each section being useable for the carriage of different items.

However, while simple in principle, such dividers are not so easily fitted into the pickup truck bed liner. This is particularly true when the pickup truck bed liner does not provide for slots and the like.

There is a particular type of very popular liner on the market which includes along its walls a plurality of V-shaped, tapered and depressed inserts. These inserts make installation of a divider wall very impractical because the wall itself is not longer flush because of their presence.

Accordingly, although the bed liner itself has many practical applications, its utility is limited by the impracticality of fitting a divider system into the bed liner, particularly when the bed liner is of the type that has tapered depressed inserts define din its walls. Prior approaches at overcoming the known problems of maximizing the utility of pickup truck beds have failed.

SUMMARY OF THE PRESENT INVENTION

The present invention provides a divider system for the cargo area of a vehicle. The system of the present invention may be adapted for use in any cargo space. In one embodiment, a divider and inserts are provided for interfitting with the tapered slots defined in the bed liner of a pickup truck and the like. In an alternate embodiment, inserts are provided for attachment to the wall of the cargo area without a liner.

The divider system comprises one or more removable divider wall portions having substantially squared ends and removable inserts.

According to one embodiment, the removable wall divider portion is preferably composed of a polymerized material and may have shelves thereon for the placement on top thereof of shelves and the like. The wall divider may include longitudinal braces provided along one or both of its top and bottom edges.

The inserts are also preferably composed of a polymerized material and include a base portion and a channel portion. The base portion defines a substantially tapered, V-shaped body being wide at its top end relative to its bottom end. The insert is inserted bottom end down into the bed liner slot defined in the wall of the bed liner.

The back side of the base portion is substantially flat, to thereby accomodate the substantially flat wall of the slot of the bed liner. The thickness of the base portion is preferably that of the depth of the tapered slot defined in the bed liner.

The base portion may have defined therethrough a number of apertures through which fasteners, such as screws, nuts and bolts and the like may be inserted for attachment of the insert to the wall of the bed liner. A channel portion is fitted to the top side of the base portion. The channel portion is axially mounted along the length of the base portion. The channel is constructed whereby the divider wall may be removably inserted therein. The divider wall may be attached to the channel by fasteners as preferred.

The insert itself is preferably of one-piece construction and may be an extrusion thereby making manufacture relatively simple.

According to the alternate embodiment of the present invention, an insert is provided for attachment to the wall of a vehicle cargo area in which no liner is provided. The insert according to this embodiment includes a U-shaped channel provided on its front side and a flat back side. The U-shaped channel receives one end of the divider wall.

The insert may be attached to the cargo area wall by an adhesive or may be locked between a pair of clamps fitted to the underside of the upper edge of the cargo area wall. A combination of these approaches may be used. These clamps prevent the insert from shifting by limiting the movement of the top of the insert or that end most likely to move on stopping and starting.

A fastener such as an eyebolt is provided to lock the divider to the insert.

Because of its light weight, the divider system of the present invention may be easily shipped and stored and may be simply manufactured. Because of its general flexibility, the divider system of the present invention may be used to construct a variety of different-sized sections within the bed of the pickup truck.

BRIEF DESCRIPTION OF THE DRAWING

The present invention will be more fully understood by reference to the following detailed description of the preferred embodiments of the present invention when read in conjunction with the accompanying drawing, in which like reference characters refer to like parts throughout the views, and in which.

DETAILED DESCRIPTION OF THE PREFERRED EMBODIMENTS OF THE PRESENT INVENTION

Figure 1:
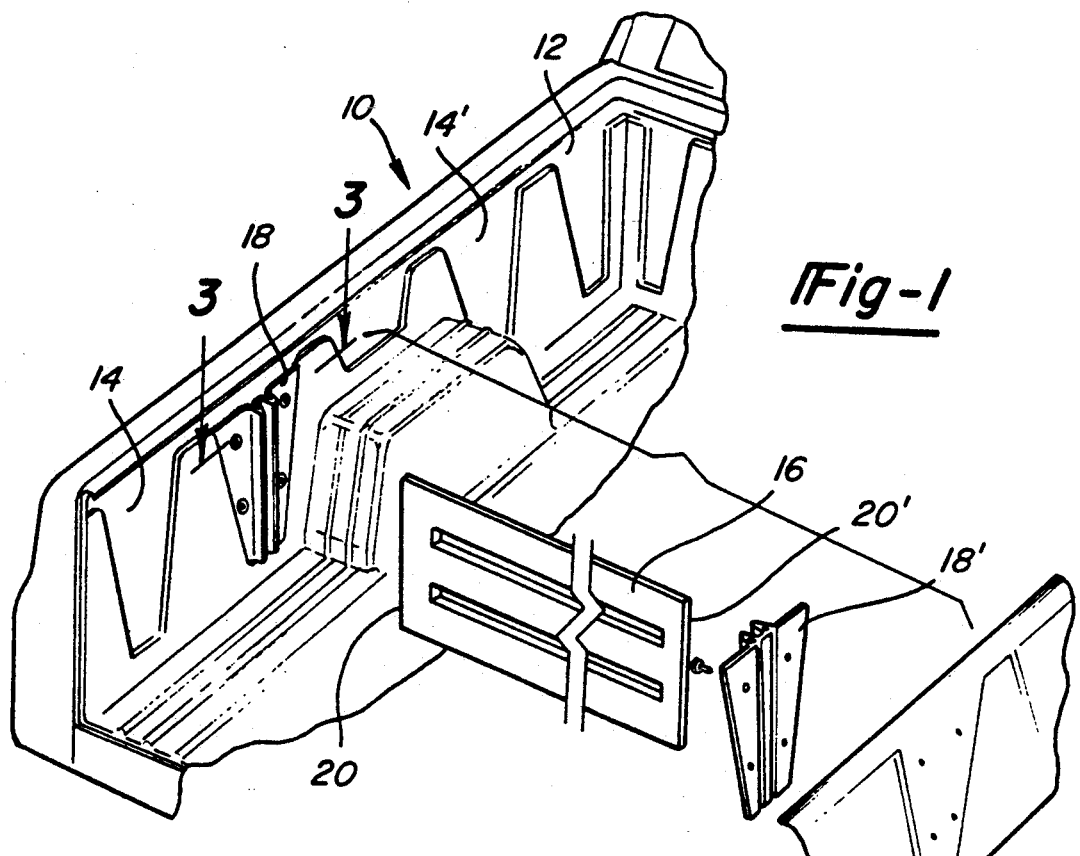
FIG. 1 is a partial perspective view illustrating the elements of a preferred embodiment of the invention showing an insert in place and the relative position of an unfixed divider.

The drawing discloses the preferred embodiments of the present invention. While the configurations according to the illustrated embodiments are preferred, it is envisioned that alternate configurations of the present invention may be adopted without deviating form the invention as portrayed. The preferred embodiments are discussed hereafter.

Figure 3:
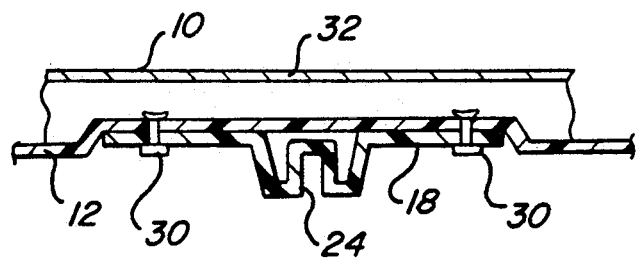
FIG. 3 is a view taken along line 3—3 of FIG. 1 illustrating the insert and its associated liner wall in cross section.
Figure 2:
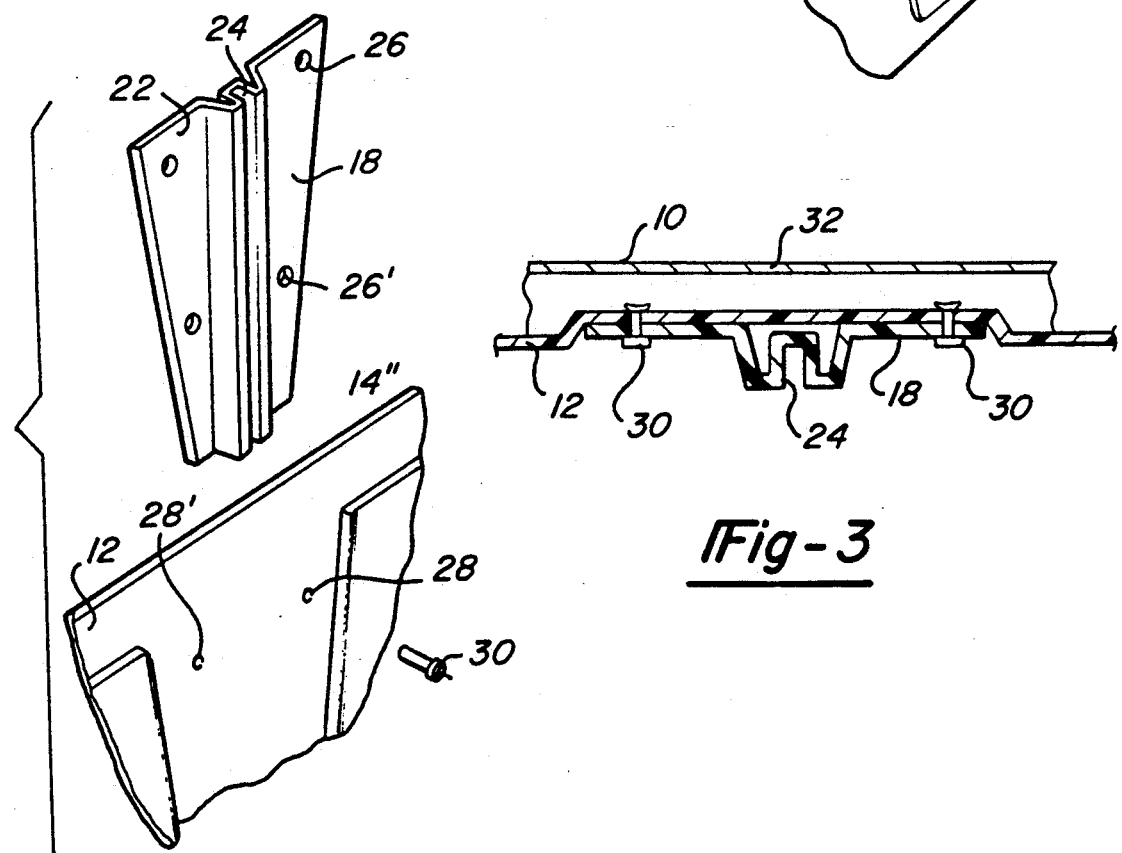
FIG. 2 is an exploded view illustrating the insert of the present invention in place above the slot to which it is to be attached.

FIGS. 1 through 3 illustrate a preferred embodiment of the present invention.

Referring to FIG. 1, the elements of the present bed liner divider system are illustrated substantially in place relative to the interior segments of a pickup truck bed and its associated liner. The pickup truck bed is generally indicated as 10, although it must be understood that this invention may be fittable in the bed portions of vans and the like.

Within the pickup bed 10 is situated a bed liner 12. The bed liner 12 is of a type having spaced apart V-shaped slots 14, 14'. These slots are provided in the liner 12 so as to improve the overall integrity of the liner construction.

The primary elements of the divider system according to the present invention comprise a divider wall 16 and an insert 18. The insert 18 has two sides. As illustrated, the divider wall is a substantially rectangular wall having a first end 20 and a second end 20'. Preferably, the divider wall 16 is composed of a light weight polymerized material.

The insert 18 is illustrated in one aspect as being slottingly fitted within a V-shaped slot of the liner 12. An additional insert 18' is illustrated as being positioned as it would be inserted in a slot.

As illustrated, the divider wall 16 is fittable and interattachable with both the inserts 18, 18'. Of course, the insert 18 is illustrated in its present slotted position only for purposes of discussion and may be situated in other slots of the liner 12 as may be preferred. Of course, minor variations in the shape of the slots 14, 14' may be made without removing the present invention form the discussed scope.

Referring to FIG. 2, an insert 18 is illustrated as it would be fitted into a slot 14". From this view it can be seen that the liner 18 is preferably composed of a one-pieced construction, and this may be most efficiently prepared in a molding or stamped process.

The insert 18 is comprised of a base portion 22 and a channel portion 24. The base portion 2 is substantially flat, whereas the channeled portion 24 is axially defined along the front side of the insert 18. As illustrated, the insert 18 has defined therethrough a number of fastening apertures 26, 26'. These apertures, when situated over a coaxial set of apertures 28, 28', may be used for fastening the insert 18 to the liner 12 by attachment with one or more of fasteners 30.

Of course, the fasteners 30 are themselves optional, as the divide wall 16 is designed to press against the channel 24 thereby keeping the insert 18 in place against the liner 12. However, for added security, the fasteners 30 may be employed.

Referring to FIG. 3, a cross sectional view of an insert 18 is illustrated in place against the liner 12. An inner wall 32 of the pickup bed 10 is also shown. According to this view, the inserted construction of the insert 18 into the slot defined in the liner 12 may be more fully understood and the channel construction 24 may also thereby be more fully understood.

Of course, the tapered, V-shape of the insert 18, according to the present illustration, is only suggested as it is well understood that the taper of the insert 18 may be of more less severe degree as may be required according to the situation and construction of the liner 12.

Figure 4:
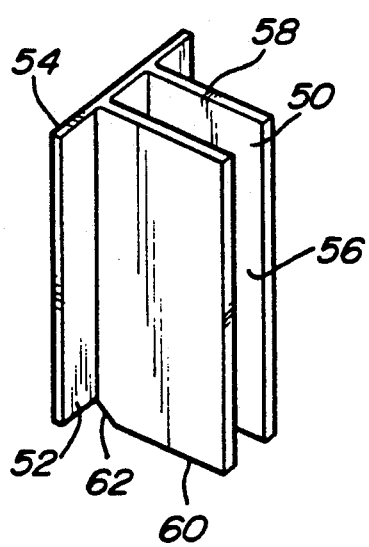
FIG. 4 illustrates a perspective view of an alternate embodiment of the insert according to the present invention.

FIGS. 4 through 9 illustrate the alternate embodiment of the present invention. According to this embodiment, and as shown in FIG. 4, an insert 50 is provided that may be fitted in vehicle cargo areas that do not have bed liners. The insert 50 is preferably a one-pieced extrusion composed of a polymerized material. Alternatively it may be composed of a metal. The insert 50 includes a front 52 and a back 54. The front 52 is provided with a U-shaped divider and an end-receiving channel 56.

The insert 50 also includes a top end 58 and a bottom end 60. As illustrated, the bottom end 60 includes a bevelled cut edge 62 which accomodates the turned-in lower portion of the inner wall of the cargo area. The bottom end 60 may be shaped as necessary to allow for inner wall portions of other dimensions.

Figure 5:
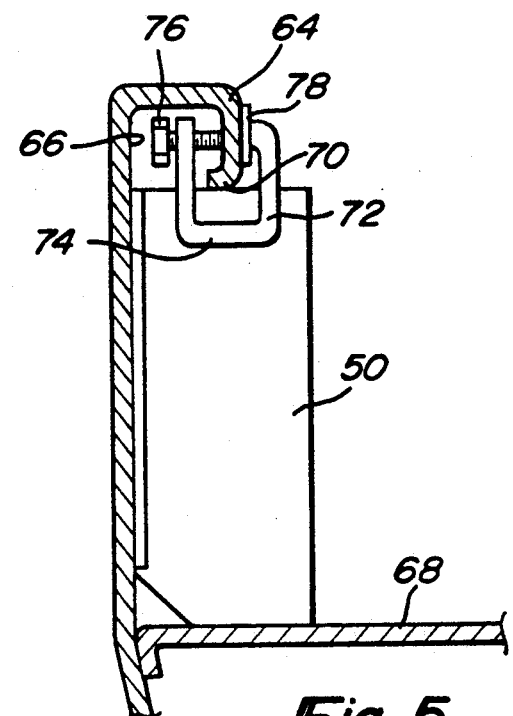
FIG. 5 illustrates an elevated side view showing the insert of the alternate embodiment in place next to the inner wall of a vehicle cargo area.

FIG. 5 illustrates the insert 50 in place in the cargo area of a vehicle. The vehicle cargo area conventionally includes an upper ledge 64, an inner wall 66, and a floor 68. The upper ledge 64 includes a downwardly-facing surface 70.

The insert 50 is positioned between the surface 70 and the floor 68. The insert 50 may extend to the inner wall 66, although in the embodiment employing an adhesive (discussed below with reference to FIG. 6) this is absolutely necessary.

It is naturally desirable to minimize movement of the insert 50. By restricting movement of the insert 50, the movement of its accompanying divider will also be restricted.

A preferred approach to restricting movement of the insert 50 is to fix the position of the insert with respect to the wall of the cargo area by use of a clamping assembly. Although there are perhaps other ways of accomplishing this, the preferred way is to provide a clamp 72 on both sides of the insert 50 (this is seen more clearly with respect to FIG. 7). Each of the clamps 72 includes a clamp body 74 and an adjustment nut 76. To prevent the paint on the upper ledge 74 form becoming marred, an insulator 78 is disposed between the clamp 72 and the surface of the ledge 64. The insulator may be a piece of rubber or a thick adhesive tape.

Figure 6:
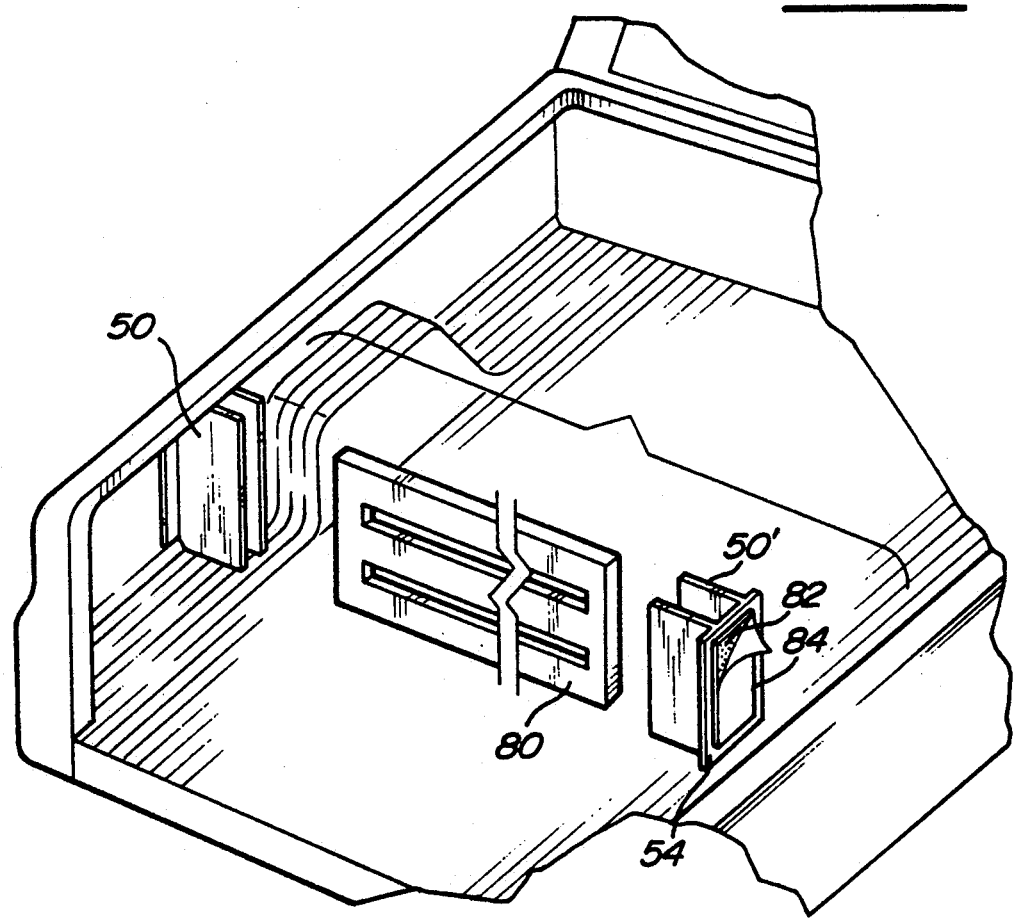
FIG. 6 illustrates a partially exploded view of a vehicle bed, a divide, and a pair of inserts.

With reference to FIG. 6, the insert 50 is shown in place within the cargo area of a vehicle. This configuration is particularly useful for use in the cargo area of a van where there is no ledge 64, although it may find applications in pick-up trucks also. According to this illustration, a divider 80 is shown disposed between a pair of inserts 50, 50'. This method of assembly features the use of adhesives for fitting the inserts 50, 50' to the surface of the inner wall 66 to restrict movement. An adhesive 82 is fitted to the back 54 of the insert 50, 50'. Preferably the adhesive 82 includes a backing tape 84 that may facilitate easy handling during shipment and storage and that may be removed by the user before being fitted to the inner wall 66.

Figure 7:
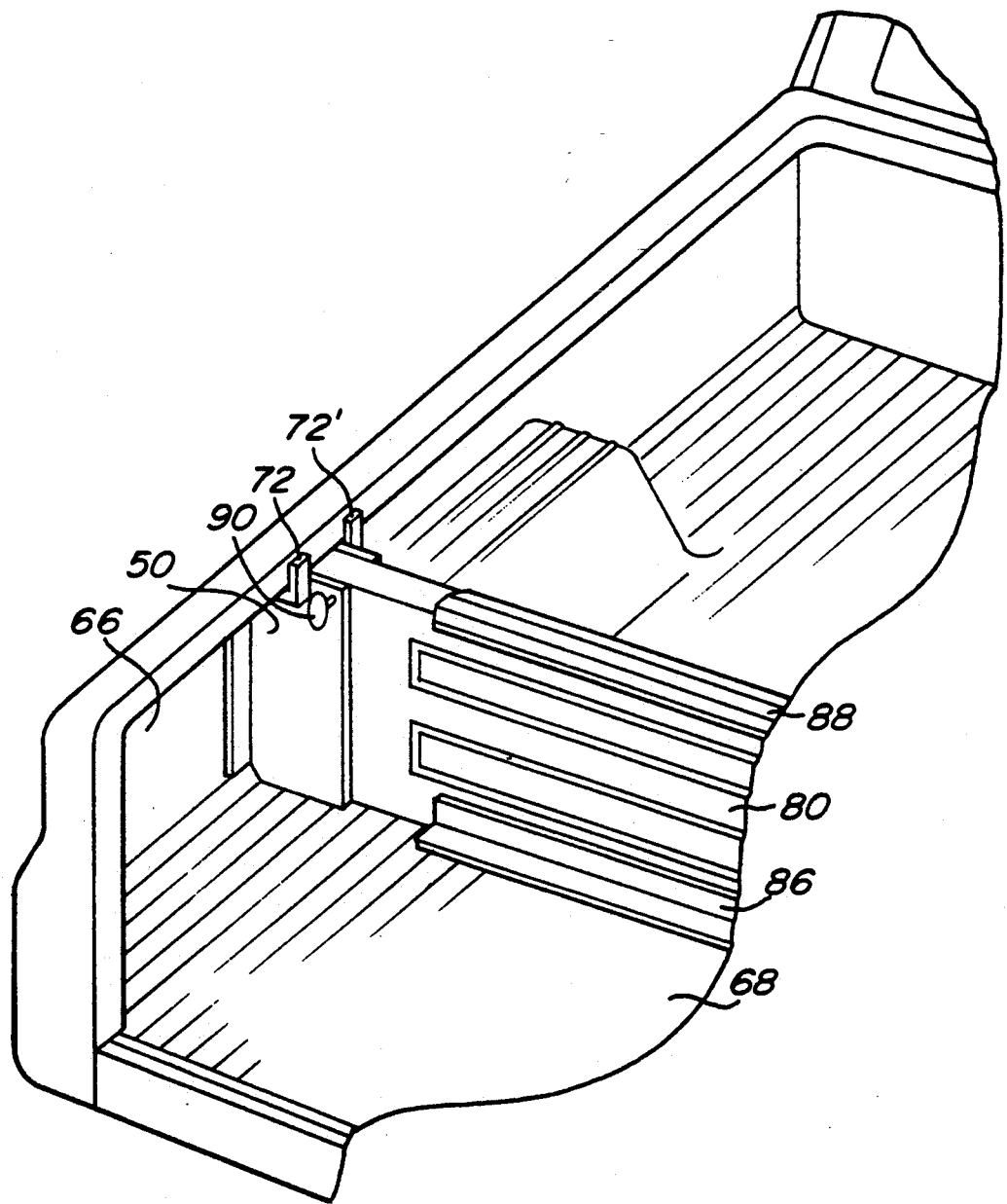
FIG. 7 illustrates the divider in place and the insert locked to the ledge of the cargo area wall of a vehicle.

With reference to FIG. 7, the divider 80 is shown in place within the cargo area of a vehicle. According to this construction and in lieu of an adhesive, the insert 50 is locked in place between a pair of clamps 72, 74'. This placement is selected in that the upper ends of the insert 50 and the divider 80 are more likely to shift while the vehicle is stopped, started, accelerated, and slowed. (The clamps 72, 72' are illustrated as being individual clamps, although it should be understood that a single clamp having a channel to accomodate the upper edge of the divider and the insert may be used.)

To add strength to the divider 80, a pair of longitudinally-provided braces may be provided. A lower brace 86 may be disposed between the lower edge of the divider 80 and the floor 68 of the cargo area. Alternatively or in addition an upper brace 88 may be longitudinally fitted to the upper edge of the divider 80. In addition to adding strength, the upper brace 88 may serve a decorative function and may be chrome plated or painted.

To increase the overall strength of the divider system of the present invention, a method of fastening the divider 80 to the insert 50 is provided. Although other locking methods may be employed, conventional fasteners may be used and may include a bolt 90 provided through both the insert 50 and the divider 80. According to the illustration, the bolt 90 is an eye bolt. This type of fastener offers considerable utility in that a variety of objects may be attached thereto, such as ropes or cables.

Figure 8:
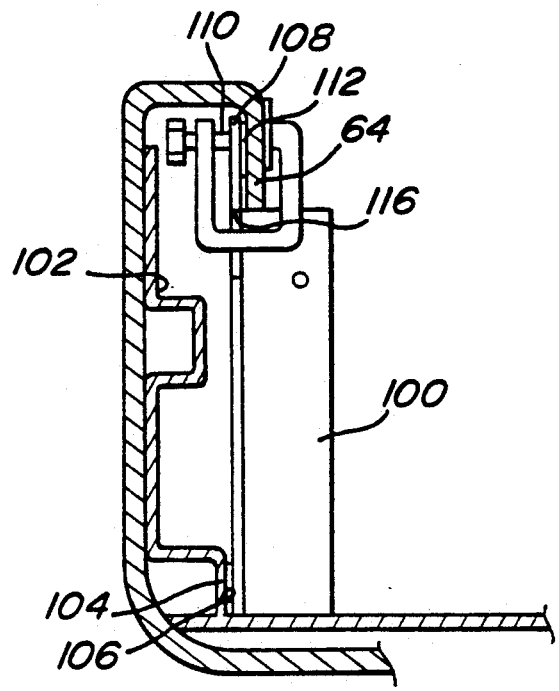
FIG. 8 is an illustration of a modified insert in place for use in applications where the cargo area inner wall is uneven.

Referring to FIG. 8, a slightly modified version of the insert 50 of FIGS. 4 through 7 is illustrated and is shown as an insert 100 fixed to the wall of a vehicle. This construction is necessary where, for example, the cargo area of the vehicle includes an irregular inner wall 102 as shown. In this instance the back of the insert 100 cannot fully contact the wall 102. Instead, the insert 100 rests in part upon a protruding area 104 of the inner wall 102. An adhesive segment 106 may be disposed between the lower end of the insert 100 and the protruding area 104.

The insert 100 also includes an upper lip 108 which is disposed between a screw 110 of the clamp 72 and the inner side of the ledge 64. Disposed between the upper lip 108 and the inner side may be an adhesive segment 112.

Figure 9:
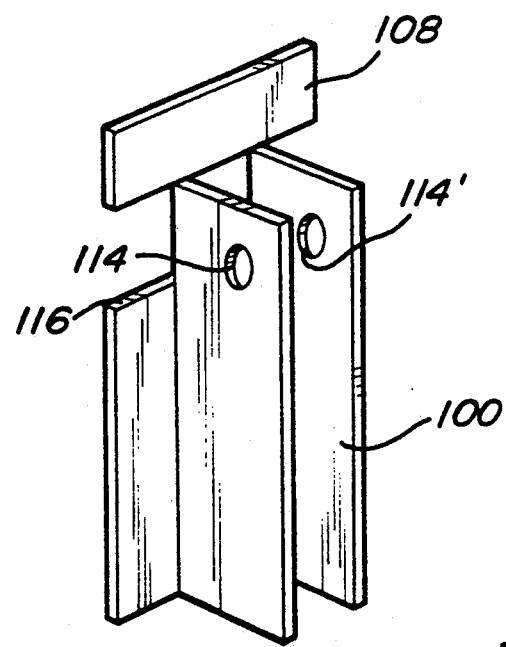
FIG. 9 is a perspective view of the insert of FIG. 8.

FIG. 9 illustrates the insert 100 in perspective view. The upper lip 108 is clearly visible in this drawing. A pair of apertures 114, 114' are included to allow insertion therethrough of the fasteners described above with respect to FIG. 7.

The insert 100 also includes a notched region 116 on each side to accomodate the clamps 72. This placement can be more readily understood by referring to FIG. 8.

Having described my invention, however, many modifications thereto will become apparent to those skilled in the art to which it pertains without deviation from the spirit of the invention as defined by the scope of the appended claims.

I claim:

1. A divider system for the cargo area of a vehicle, said cargo area having a floor and walls, each of said walls including an upper ledge, said system comprising:
   a removable divider portion having a longitudinal axis and further including a pair of ends, a top edge and a bottom edge;
   an insert positionable between the upper ledge of the wall and the floor of the cargo area;
   said insert having a front, a back, and two sides, said front including a divider end receiving portion;
   means for stabilizing said insert, said means for stabilizing comprising a clamp assembly;
   said insert having defined therein a pair of notched regions to accomodate said clamp assembly;
   said clamp assembly including two clamps, one each being attachable to said upper ledge on each side of said insert within one of said notched regions whereby said insert is locked therebetween.

2. The divider system of claim 1 wherein said end receiving portion comprises a channel.

3. The divider system of claim 2 wherein said insert has a longitudinal axis and said channel is disposed along said longitudinal axis of said insert.

4. The divider system of claim 1 wherein said back side of said insert is planar.

5. The divider system of claim 1 wherein said back side of said insert has an adhesive fixed thereto.

6. The divider system of claim 1 wherein said insert is of one-pieced construction.

7. The divider system of claim 1 wherein said insert is an extrusion.

8. The divider system of claim 1 further including means for interlocking said divider and said insert.

9. The divider system of claim 8 wherein said means for interlocking comprises a fastener.

10. The divider system of claim 9 wherein said fastener is an eye bolt.

11. The divider system of claim 1 further including scratch preventive insulation disposed between said ledge and said clamp assembly.

12. The divider system of claim 1 wherein said divider portion has fitted thereon means for strengthening said divider.

13. The divider system of claim 12 wherein said means for strengthening includes a brace fitted longitudinally along said bottom edge of said divider.

14. The divider system of claim 12 wherein said means for strengthening includes a brace fitted longitudinally along said top edge of said divider.

* * * * *

UNITED STATES PATENT AND TRADEMARK OFFICE
CERTIFICATE OF CORRECTION

PATENT NO.    : 5,259,712
DATED         : November 9, 1993
INVENTOR(S)   : Mark Wayne It is certified that error appears in the above-identified patent and that said Letters Patent is hereby corrected as shown below:

Column 1, line 41, delete "form" and insert -- from --.

Column 2, line 5, delete "define din" and insert -- defined in --.

Column 3, line 32, delete "divide," and insert -- divider --.

line 47, delete "form" and insert -- from --.

Column 4, line 14, delete "form" and insert -- from --.

line 21, delete "2" and insert -- 22 --.

line 30, delete "divide" and insert -- divider --.

Column 5, line 15, delete "74 form" and insert -- 64 from --.

Signed and Sealed this

Twenty-sixth Day of July, 1994

Attest:

BRUCE LEHMAN

*Attesting Officer*                *Commissioner of Patents and Trademarks*